United States Patent Office 3,160,834
Patented Dec. 8, 1964

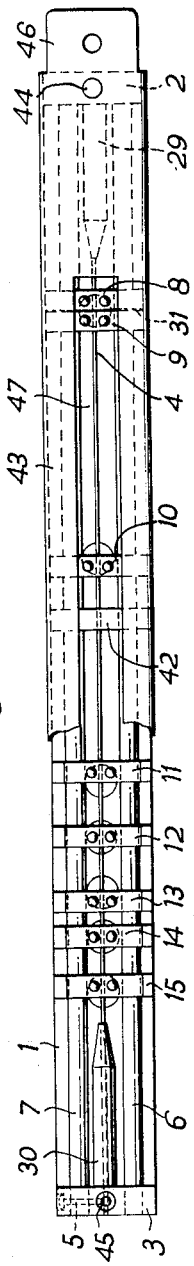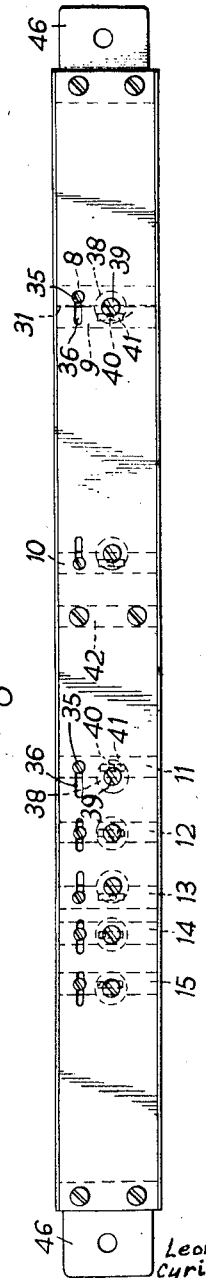

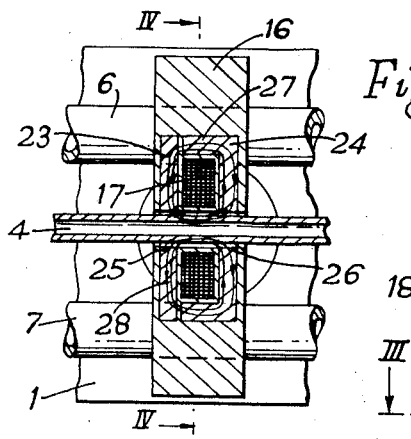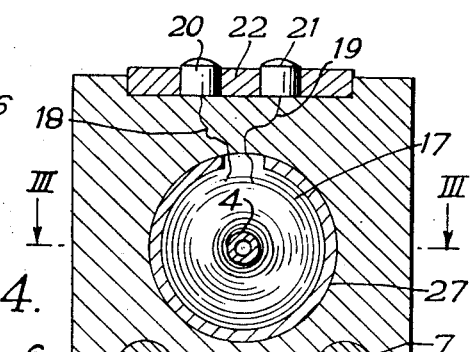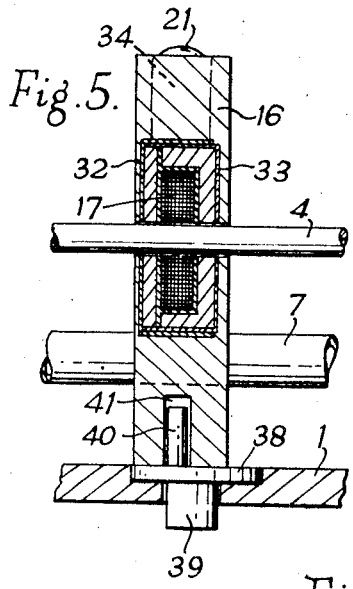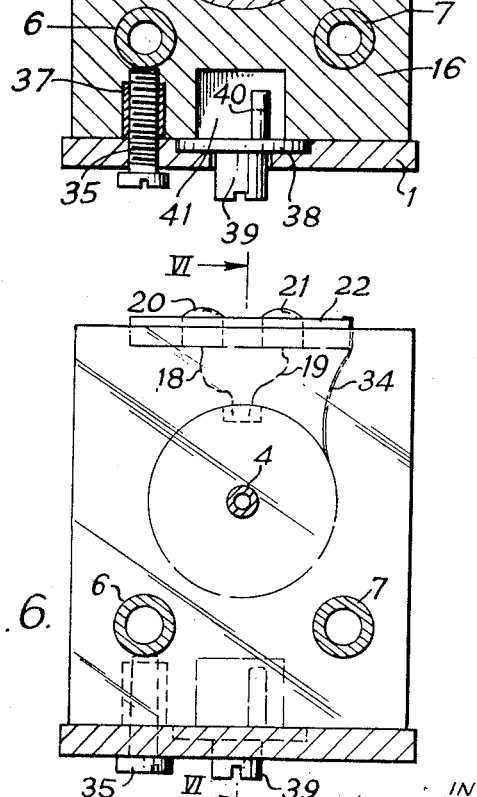

3,160,834
MAGNETOSTRICTIVE ELECTRO-MECHANICAL TRANSDUCERS
Leonard Perkins, Twickenham, Cyril Henry Stevens, Ilford, and Alan Philip Craven Thiele, London, England, assignors to A. C. Cossor Limited, London, England, a British company
Filed Nov. 9, 1959, Ser. No. 851,772
Claims priority, application Great Britain, Nov. 13, 1958, 36,497/58
6 Claims. (Cl. 333—30)

The present invention relates to magnetostrictive electro-mechanical transducers.

The application of an electrical impulse to such a transducer is arranged to set up a magnetic field which creates a mechanical strain in a magnetostrictive element. If a mechanical impulse is applied to the magnetostrictive element the resulting change of magnetic field induces an electrical output signal.

The invention is of particular value in the application of such transducers to the construction of delay lines for electrical circuits in which the delay is determined by the time of travel of the strain impulse in the magnetostrictive element between a transmitting or exciting transducer and a receiving or pick-up transducer.

According to the present invention an electromechanical transducer includes an elongated element of magnetostrictive material and an electromagnetic pick-up transducer assembly constituted by a coil surrounding the magnetostrictive element and a shell of ferromagnetic material enclosing the coil, a part of the shell being permanently magnetised and the manner of magnetisation of the shell and its arrangement relative to the magnetostrictive element being such that flux resulting from the said magnetisation extends through the shell and generally longitudinally through that part of the magnetostrictive element which is surrounded by the coil.

The coil is usually, though not necessarily, circular and the shell may then be formed of a radially magnetised disc and a second disc of relatively soft magnetic properties with a peripheral flange forming the outer wall of the shell. Alternatively the outer wall of the shell may be a short axially-magnetised, hollow cylinder.

The magnetisation of the shell is preferably concentrated in that part of it adjacent the coil in order to minimise stray flux outside the boundaries of the transducer.

In a magnetostrictive delay line in accordance with the invention the magnetostrictive element is in the form of a rod or tube and an exciting transducer assembly is mounted on the rod or tube at a distance from the pick-up transducer assembly.

In one embodiment of this delay line a test pick-up transducer assembly is mounted adjacent the exciting assembly with screening material between the assemblies to reduce coupling between the coils of the two assemblies. The signal derived from this test transducer assembly can be employed to adjust the amplification of signals appearing in the output circuits of other pick-up transducer assemblies to compensate for changes in the transmission characteristic of the line.

An embodiment of the invention in a magnetostrictive delay line will now be described by way of example with reference to the accompanying drawings, in which FIG. 1 is a plan view of the delay line with part of its cover cut away to show some constructional features more clearly, FIG. 2 is a plan view of the line from below, FIG. 3 is a longitudinal section of one pick-up transducer of the line on a plane parallel to the base of the line, FIG. 4 is a transverse section of the transducer of FIG. 3, FIG. 5 is a longitudinal section of a modified form of pick-up transducer on a plane perpendicular to the base, and FIG. 6 is a transverse elevation of the modified form of transducer with parts of the structure of the delay line shown in section.

Referring to FIG. 1, the delay line has a base 1 to the ends of which are attached upstanding end members 2 and 3. The end members 2 and 3 support an elongated magnetostrictive element in the form of a nickel tube 4 one end of which is secured in an aperture in the end member 3 by means of a screw 5 and the other end of which is similarly secured in the end member 2. Two tubular rails 6 and 7 are also fixed in the end members 2 and 3 by means of clamping screws and serve to support a number of electromagnetic transducer assemblies 8 to 15 at spaced positions along the nickel tube 4. The transducers 8 to 15 are of similar construction but the exciting transducer 8, unlike the pick-up transducers 9 to 15, is not permanently magnetised to provide a magnetic bias.

Sections of one of the pick-up transducer assemblies are shown in FIGS. 3 and 4. The transducer assembly is constituted by a rectangular block 16 of insulating material, such as "Araldite" (Registered Trademark) in which a circular coil 17 has been embedded, the leads 18 and 19 to the coil running to soldering points 20 and 21 respectively on an insulating board 22 sunk into the top of the block and the coil being enclosed in a flat circular shell formed by a disc 23 and a flanged disc 24. The disc 23 forming one side wall of the shell is permanently magnetised radially and has a central aperture 25 through which the tube 4 passes with a small clearance. The flanged disc 24, not having to be permanently magnetised, is made of a material of relatively soft magnetic properties. It has a central aperture 26 in the part forming the other side wall of the shell and its flange forms the outer surrounding wall 27 of the shell.

The magnetised disc 23 may be made of barium ferrite or of other magnetic materials such as Cunife (Trademark). The flanged disc 24 can conveniently also be made of a ferrite.

The permanent magnetisation of the disc 23 is preferably concentrated near the inner side adjacent the coil 17, in order to minimise its effect outside the transducer assembly. This is indicated by the magnetic flux lines 28. The magnetic field of this disc applies a bias to the magnetostrictive tube 4 to bring it to the optimum operating condition for picking up a change of mechanical strain in the tube and converting it into an electrical output signal in the coil 17. The application of a current impulse to the coil 17 of the exciting transducer assembly 8 creates a magnetic flux in the magnetic circuit constituted by the walls of the shell surrounding the coil 17 and the part of the magnetostrictive tube 4 running through the centre of the transducer assembly. The shell is in this case wholly of material of low retentivity since no permanent magnetic bias is required. The strain in the part of the tube running through the centre of the assembly, resulting from the magnetic field, travels along the tube and induces a corresponding electrical signal in each of the pick-up transducer assemblies 9 to 15. The ends of the tube 4 are provided with sleeves 29 and 30 of polyvinyl chloride forming matched loads for the ends of the delay line and serving to eliminate unwanted reflections. These sleeves are moulded separately and then cemented to the tube 4 with Bostik D adhesive.

The transducer assemblies 10 to 15 are employed as pick-up transducers with different delay times corresponding to their differing distances from the exciting transducer 8. The transducer assembly 9 which serves as a test transducer is placed as close as possible to the exciting transducer 8 and is separated from it only by a sheet 31 of mu-metal serving as a screen to reduce coupling between assemblies to a minimum. The signal induced in the test transducer corresponds to a very short delay time and its amplitude is dependent upon changes in the magnetostrictive properties of the nickel tube and the magnetisation of the shell of the pick-up coil. These characteristics vary with temperature and the signal from the test transducer can be employed to vary the amplification of the signal applied to the exciting transducer or those induced in the pick-up transducers to maintain a signal of constant amplitude independent of these changes.

An alternative method of screening is to enclose the operative elements of each transducer assembly in a sheet of conducting but nonmagnetic material such as copper foil, as shown in FIGS. 5 and 6. The sheath is formed by two cylindrical caps 32 and 33 put over opposite sides of the shell formed by the magnetised disc 23 and the flanged disc 24 and overlapping. A strip 34 extends from the sheath to the insulating board 22 to enable earthing contact to be made to the sheath.

The concentration of the magnetisation of the disc 23 on the inside, adjacent the coil, reduces stray flux outside the transducer assembly to a minimum and enables the assemblies to be placed close to one another for small delay times. Screening only becomes necessary when they are placed very close together, as are the assemblies 8 and 9.

A change in ambient temperature may affect not only the magnetisation of the shell of each of the transducer assemblies and the magnetostrictive properties of the tube, but also the length and transmission characteristics of the tube. These latter effects can be to some extent compensated by the provision of spacers of, for example, polytetrafluoroethylene, having a suitable temperature coefficient of expansion, on the rails 6 and 7 between the end member 2 and the exciting transducer assembly 8.

The transducer assemblies are slidable on the rails 6 and 7 and are secured in position by set screws 35 extending through slots 36 in the base 1 and tapped sleeves 37 set in the Araldite blocks 16 and engaging against the surface of the rail 6. Each of the transducer assemblies 10 to 15 and the combined assembly 8 and 9 can be adjusted in position before tightening of the corresponding set screw 35 by means of an adjustment element consisting of a disc 38 resting in a countersunk aperture in the upper surface of the base 1, rotatable about its centre by means of a slotted head 39 and carrying an eccentrically mounted pin 40 which engages in a slot-like hole 41 in the bottom of the block 16. The transducer assemblies are shown in FIGS. 1 and 2 in various conditions of adjustment to illustrate the mode of use of the adjustment element.

The structure of the delay line is completed by a spacer 42 fixed to the centre of the bottom support 1 and a detachable cover 43 screwed to the end members 2 and 3 at 44 and 45 respectively and having fixing lugs 46 at its ends and a slot 47 allowing access to the soldering points 20 and 21 of each of the transducer assemblies.

We claim:
1. A magnetostrictive delay line comprising an elongated element of magnetostrictive material, an electromagnetic excitation transducer assembly for exciting said element including an energising coil surrounding a first part of the magnetostrictive element, an electromagnetic transducer pick-up assembly including a generally circular pick-up coil surrounding a second part of the magnetostrictive element and a shell of ferromagnetic material enclosing the pick-up coil, the shell having a permanently-magnetised portion in the form of a radially magnetised disc arranged on one side of said pick-up coil and a second portion of relatively soft magnetic properties arranged on the opposite side of said pick-up coil, both portions having a central aperture through which the magnetostrictive element passes, including a test pick-up electromagnetic transducer assembly positioned between said excitation transducer assembly and said pick-up transducer assembly and immediately adjacent said excitation transducer assembly, and a screen separating said excitation transducer assembly and said test transducer assembly to reduce direct coupling therebetween, said screen being separate from said shell, said test transducer assembly including a generally circular pick-up coil surrounding a third part of the magnetostrictive element, a disc positioned adjacent one face of said circular pick-up coil and being permanently magnetized radially thereof, and a member of material of relatively soft magnetic properties forming with the magnetised disc a shell enclosing the pick-up coil and having a central aperture through which the magnetostrictive element passes.

2. A delay line as claimed in claim 1 in which the separate screen is composed of ferromagnetic material in order to reduce magnetic coupling.

3. A delay line as claimed in claim 1 in which the separate screen is composed of non-magnetic and electrically conductive material.

4. A delay line as claimed in claim 1 including a sheath of screening material enclosing one of the exciting and test transducer assemblies and incorporating said screen.

5. A magnetostrictive delay line comprising an elongated element of magnetostrictive material, an electromagnetic excitation transducer assembly for exciting said element including an energising coil surrounding a first part of the magnetostrictive element, an electromagnetic transducer pick-up assembly including a generally circular pick-up coil surrounding a second part of the magnetostrictive element and a shell of ferromagnetic material enclosing the pick-up coil, the shell having a permanently-magnetized portion in the form of a radially magnetised disc arranged on one side of said pick-up coil and a second portion of relatively soft magnetic properties arranged on the opposite side of said pick-up coil, both portions having a central aperture through which the magnetostrictive element passes, blocks of insulating material in which said exciting and pick-up transducer assemblies are embedded, supporting structure on which said magnetostrictive element is mounted, at least one rail mounted on said supporting structure in a position parallel to the magnetostrictive element, a plurality of adjusting elements rotatably mounted on said supporting structure, and a pin eccentrically mounted on each of said adjusting elements, each of said blocks in which the transducer assemblies are embedded being mounted for sliding movement along the rail and having a slot-like hole for co-operation with the pin of a respective adjusting element whereby on rotation of said adjusting element the position of the block is adjusted longitudinally of the rail.

6. A delay line as claimed in claim 5 including means for clamping each block to the rail in a desired position.

References Cited in the file of this patent
UNITED STATES PATENTS

| | | |
|---|---|---|
| 2,453,595 | Rosenthal | Nov. 9, 1948 |
| 2,455,740 | Curtis | Dec. 7, 1948 |
| 2,487,815 | Lee | Nov. 15, 1949 |
| 2,490,273 | Kean | Dec. 6, 1949 |
| 2,619,605 | Lancor | Nov. 25, 1952 |
| 2,846,654 | Epstein et al. | Aug. 5, 1958 |
| 2,874,470 | Richards | Feb. 24, 1959 |
| 3,016,498 | Powell | Jan. 9, 1962 |
| 3,078,426 | Foundas | Feb. 19, 1963 |